United States Patent [19]

Lamb

[11] 4,339,224

[45] Jul. 13, 1982

[54] APPARATUS FOR ACCOMMODATING WHEELCHAIRS IN PUBLIC TRANSPORTATION VEHICLES

[76] Inventor: Charles A. Lamb, 462 W. Thurber, Tucson, Ariz. 85705

[21] Appl. No.: 185,308

[22] Filed: Sep. 8, 1980

[51] Int. Cl.³ .............................................. B60P 3/06

[52] U.S. Cl. ...................................... 414/501; 296/64; 340/568; 340/686; 410/1; 410/3; 414/507; 414/921

[58] Field of Search .............. 414/467, 501, 502, 505, 414/507, 537, 921; 296/64; 410/1, 3; 340/568, 686

[56] References Cited

U.S. PATENT DOCUMENTS

| | | | |
|---|---|---|---|
| 4,109,809 | 8/1978 | Clark | 414/501 X |
| 4,131,209 | 12/1978 | Manning | 414/537 |

*Primary Examiner*—Robert G. Sheridan

*Attorney, Agent, or Firm*—Cahill, Sutton & Thomas

[57] ABSTRACT

A system for accommodating persons confined to wheelchairs in a public transportation vehicle, such as a bus, includes a main turntable having a padded center-post. A ramp attached to the vehicle effects conveying of the wheelchair and the person occupying it to the edge of the turntable, allowing the wheelchair to be moved onto one of a plurality of stations into which the turntable is divided. The turntable is then rotated to align another station for receiving another wheelchair from the ramp.

15 Claims, 11 Drawing Figures

APPARATUS FOR ACCOMMODATING WHEELCHAIRS IN PUBLIC TRANSPORTATION VEHICLES

BACKGROUND OF THE INVENTION

1. Field of the Invention

The invention relates to apparatus for accommodating wheelchairs occupied by handicapped persons in public transportation vehicles, such as buses and the like.

2. Description of the Prior Art

Various statutes and regulations require that certain public transportation vehicles provide accommodations for handicapped persons confined to wheelchairs. For example, some municipal bus companies are required to provide both ramps on a certain percentage of their buses for loading wheelchairs occupied by handicapped persons into the buses and spaces within the buses for accommodating the wheelchairs and the occupants therein after loading. A variety of lift systems for transit vehicles for accomplishing loading and unloading of wheelchairs with the occupants confined thereto are known, as indicated in U.S. Pat. Nos. 4,138,023; 4,180,366; 4,168,134; 4,140,230; 4,071,152; and 3,957,164. However, none of the foregoing references disclose any systems suitable for conveniently and safely accommodating the wheelchairs and occupants therein and within a transit vehicle after they have been loaded thereon by means of the various known wheelchair lift systems. Most commonly, several seats have been removed from the bus to provide space wherein one or several wheelchairs can be guided and secured by means of straps or the like. However, this system presents a great deal of inconvenience to bus drivers due to the fact that there are no convenient facilities on known transit vehicles for safely securing the wheelchairs and their occupants in the provided spaces. Consequently, each time a handicapped person and his or her wheelchair is loaded onto the transit vehicle, the driver must leave his seat and go back to strap the handicapped person and his or her wheelchair safely into the allocated space. Usually, considerable difficulty is experienced in moving the wheelchair with its occupants from the lift and positioning the wheelchair with its occupant in the desired space. The inconvenience and amount of time required for the driver to perform the foregoing tasks makes it very difficult for him or her to maintain a precise schedule and generally makes the driver's work unduly difficult. Furthermore, the driver's assistance is frequently required in unfastening and unloading the wheelchair and its occupant when the occupant's desired destination has been reached. Thus, there clearly is an unmet need for an improved system for safely accommodating persons confined to wheelchairs in public transportation vehicles.

Accordingly, it is an object of the invention to provide an improved system for accommodating wheelchairs and occupants confined thereto within a transportation vehicle.

It is another object of the invention to provide a system for accommodating persons confined to a wheelchair in a transit vehicle, which system does not require the assistance of the transit vehicle driver to leave his seat in order to assist in loading or unloading the wheelchair and occupant confined thereto from the transit vehicle or in securely fastening or unfastening the occupant and his or her wheelchair safely within allocated space within the transit vehicle.

It is another object of the invention to provide a system for accommodating persons confined to wheelchairs, which system requires very little or no fastening or securing of the wheelchairs within the transit vehicle after the wheelchairs and occupants confined thereto have been loaded into the transit vehicle.

SUMMARY OF THE INVENTION

Briefly described, and in accordance with one embodiment thereof, the invention provides a large main turntable located in a transit vehicle adjacent to a retractable ramp or wheelchair lift utilized in loading and unloading a wheelchair and its occupant onto and off of the transit vehicle, the main turntable having a plurality of wheelchair accommodating spaces or stations which are respectively aligned with the retractable ramp in order to allow wheelchairs and their occupants to be rolled directly from the retractable ramp onto the main turntable. A large, padded centerpost limits the forward movement of the wheelchair relative to the main ramp. A padded retaining wall surrounds the portions of the main turntable which are not adjacent to the retractable ramp, so that if the station adjacent to the ramp has a wheelchair thereon, and if the main turntable is rotated by an amount sufficient to align an adjacent station with the ramp, the rear portion of the wheelchair is disposed adjacent to the padded wall. Forward and rearward movement of the wheelchair relative to the main turntable are limited by the padded post and padded wall, respectively. In one embodiment of the invention, a plurality of sub-turntables are provided within the main turntable, each such sub-turntable constituting one station of the main turntable. The sub-turntables can be rotated 180° to facilitate unloading of the wheelchair and its occupant by permitting the wheelchair to roll forward during both loading and unloading thereof. In one embodiment of the invention, speakers are provided for each station within the main turntable assembly allowing the occupant of that station to communicate with the bus driver. Controls are provided allowing either the transit vehicle driver or the occupant of one of the stations to control the orientation of the sub-turntable. Means for securing a wheelchair and its occupant within a given station, such as retractable safety straps, are provided at each station in one embodiment of the invention.

DESCRIPTION OF THE INVENTION

Figure 1:
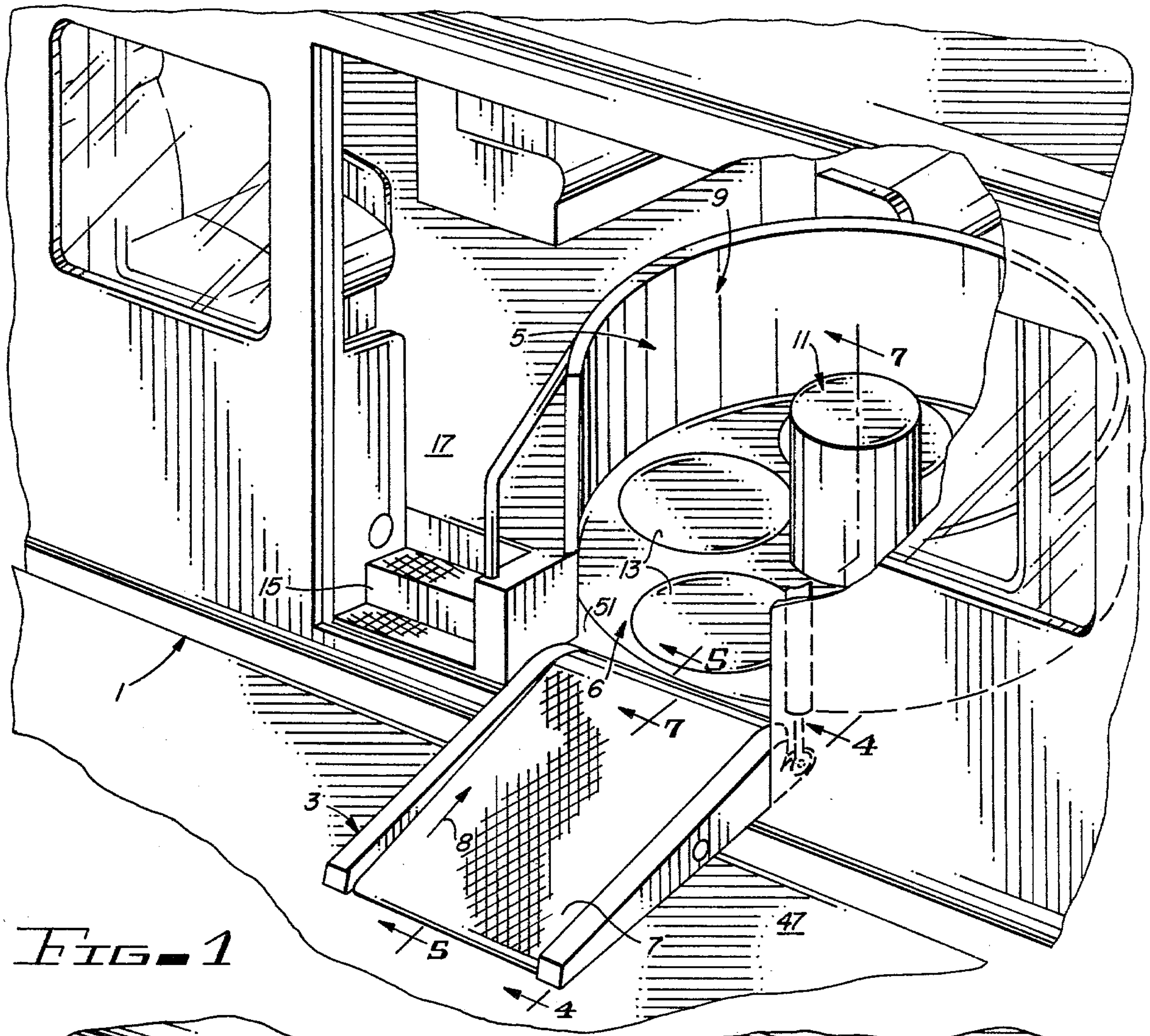
FIG. 1 is a partial cutaway perspective view illustrating the wheelchair accommodating system of the present invention.

Referring now to FIG. 1, reference numeral 1 designates a transit vehicle, which in the described embodiment of the invention, is a municipal bus. Reference numeral 3 designates a retractable loading ramp having a moving conveyor surface 7 which moves in a direction indicated by arrow 8 in order to move a wheelchair and occupant confined thereto into an opening in the side of bus 1.

Note that bus 1 also has a conventional entry way including steps 15 for walking passengers, enabling them to step from curb 47 up to main floor 17 of bus 1.

In accordance with the present invention, bus 1 includes a main turntable 6 having an upper surface which is flush with an edge section 51 of a lower floor, which is somewhat lower than main floor 17. A plurality of sub-turntables 13 are rotatably disposed in main turntable 6, which is capable of rotating to align respective ones of sub-turntables 13 with the upper edge of retractable ramp 7. A padded centerpost 11 extends upward from the center of main turntable 6. A padded circular wall 9 surrounds the peripheral portions of main turntable 6 to the sides of the entry way leading into the wheelchair-accommodating region bounded by wall 9. The height of padded post 11 and padded wall 9 are sufficient to provide cushioned surfaces which are positioned so as to absorb any impact occurring if a wheelchair or its occupant collide with centerpost 11 or wall 9, as in the event of a sudden jolt which could be caused by any sudden stopping of bus 1.

As subsequently explained, a wheelchair and its occupant can be rolled onto ramp 3, which then slowly moves in a direction indicated by arrow 8, moving the wheelchair onto the adjacent sub-turntable 13. Main turntable 6 is then rotated 72° (if there are 5 sub-turntables) in order to align the subsequent sub-turntable with the upper end of retractable ramp 7. Note that each sub-turntable 13 underlies a region referred to as a "station," which accommodates one wheelchair and its occupant.

Figure 2:
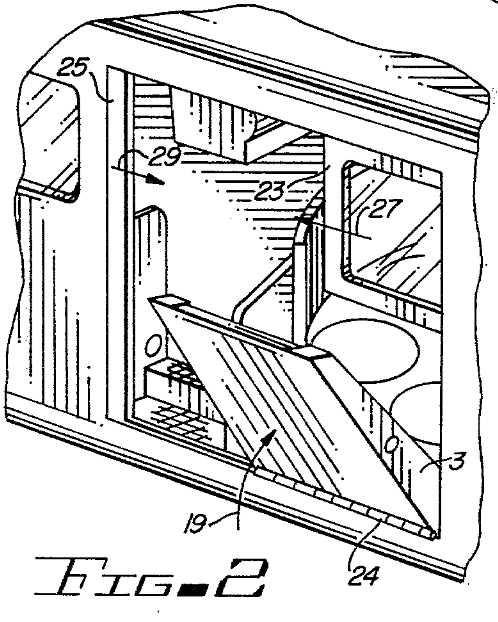
FIG. 2 is a partial cutaway view illustrating closing of the loading ramp shown in FIG. 1.
Figure 3:
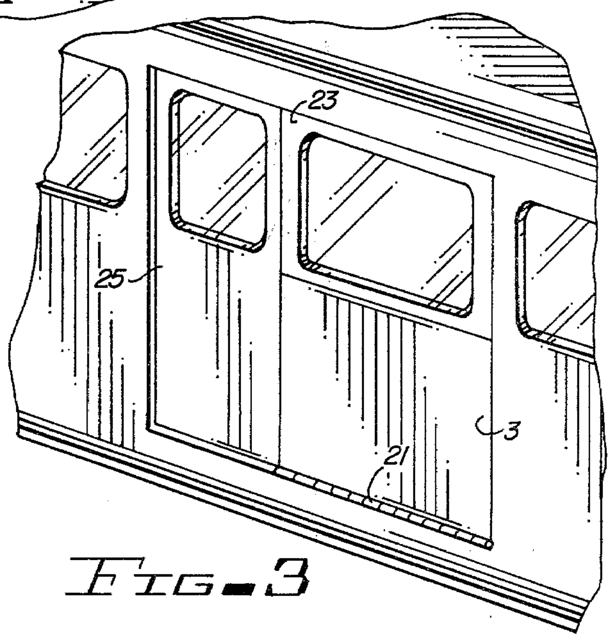
FIG. 3 is a partial perspective side view of a transit vehicle incorporating the invention wherein the passenger entry ways are closed.

As shown in FIG. 2 and FIG. 3, the retractable ramp 3 forms the lower portion of the door for the opening into the wheelchair-accommodating region bounded by wall 9. A sliding upper door 23 moves in the direction indicated by arrow 27 to close the upper portion of the entry opening for wheelchairs and occupants confined thereto. Main passenger entry door 25 moves in the direction indicated by arrow 29 to the position indicated in FIG. 3, after passengers have been either loaded or unloaded and the bus is ready to move toward the next bus stop.

FIGS. 4–7 disclose the main operative details of retractable ramp 3, which is particularly well adapted for use in conjunction with the turntable apparatus shown in FIG. 1, although various ones of the wheelchair lifts disclosed in the previously mentioned patents could also be used.

Figure 4:
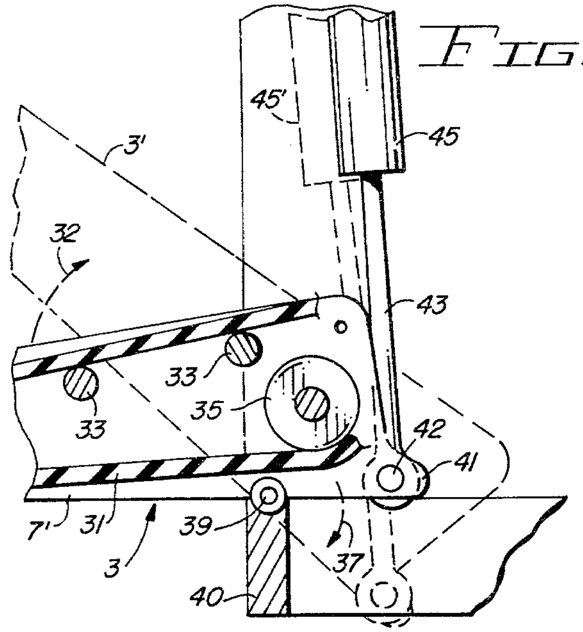
FIG. 4 is a partial section view taken along section line 4—4 of FIG. 1.
Figure 5:
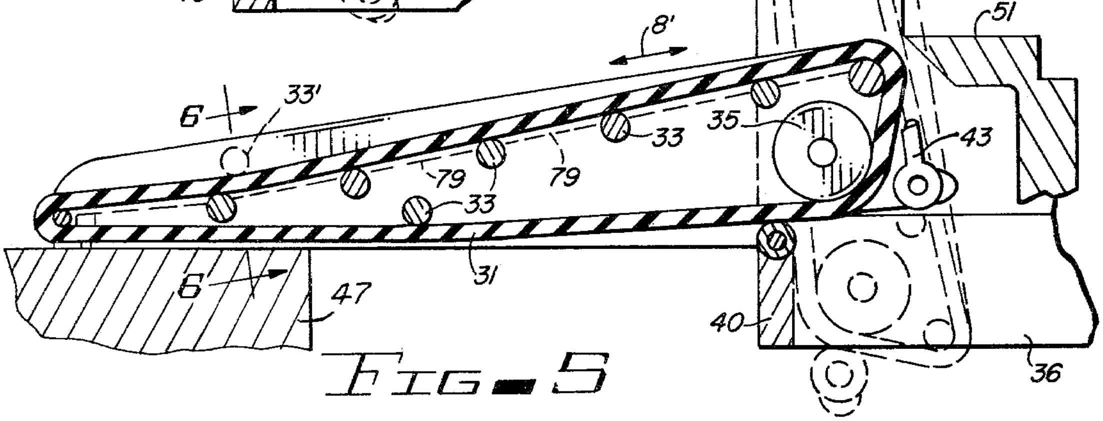
FIG. 5 is a partial section view taken along section line 5—5 of FIG. 1.
Figure 6:
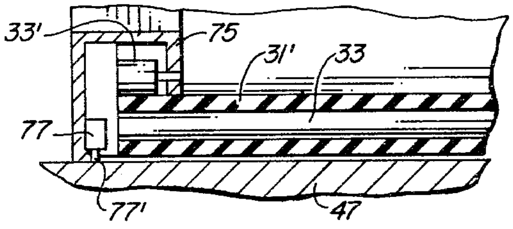
FIG. 6 is a partial section view taken along section line 6—6 of FIG. 5.

Referring now to FIGS. 4–6, retractable ramp 3 has a pair of side members 7′ which support a plurality of rollers 33. A reversible motor and pulley assembly designated by reference numeral 35 engages conveyer belt 31, which moves along rollers 33 in either of the directions indicated by arrow 8′. A smooth, low friction support surface indicated by dotted lines 75 keeps the upper section 31′ of belt 31 from sagging between the various rollers 33, preventing "bumping" as the wheelchair and its occupant are conveyed by conveyer belt 31 into or out of bus 1.

Retractable ramp 3 is pivotally connected by means of pin 39 to frame member 40 of bus 1. The portion 41 of ramp 3 extending to the left of pivot pin 39 (FIGS. 4 and 5) is pivotally connected by means of pin 42 to a rod 43. Rod 43 is connected to a piston of a hydraulic cylinder 45. If rod 43 is expelled by cylinder 45, retractable ramp 3 tilts upward into the positions indicated by reference numeral 3′ in FIGS. 4 and 5.

A limit switch 77 disposed on the extreme end of retractable ramp 3 includes an actuating element 77′, which senses the elevation of the top surface of a curb 47, and provides feedback by means of a wire and control system (not shown) to control hydraulic cylinder 45, thereby allowing the lowering of ramp 3 to cease when the upper surface of curb 47 is reached. This enables a person confined to a wheelchair to easily move his or her wheelchair onto the moving belt 7 of retractable ramp 3.

As can be seen in FIG. 6, upper rollers 33′ disposed in side members 7′ of retractable ramp 3 hold the upper section 31′ of belt 31 against both supporting rollers 33 and support surfaces 79.

Figure 7:
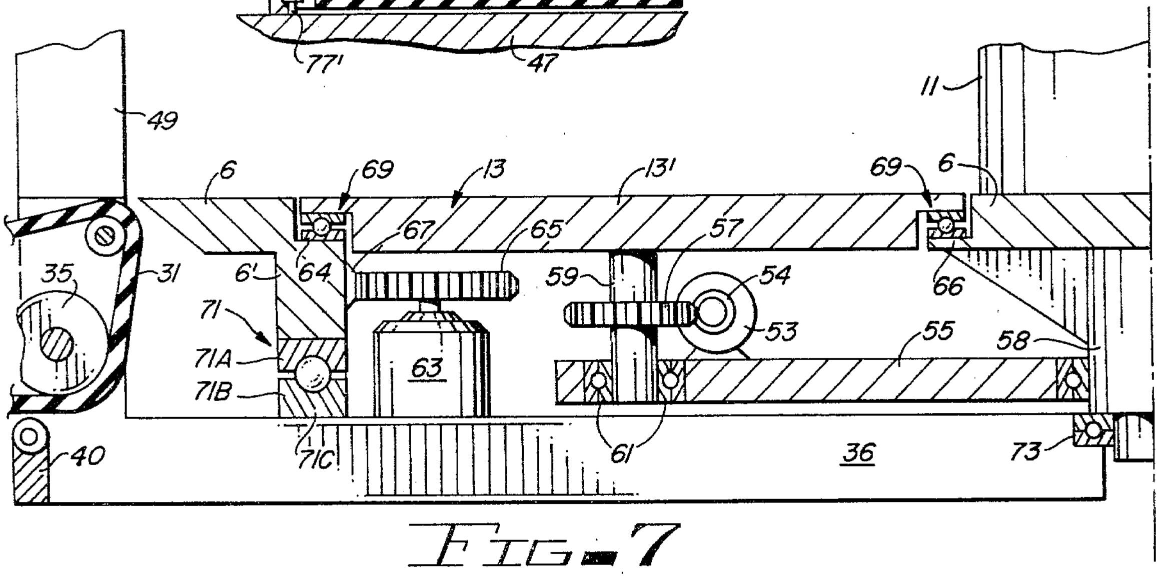
FIG. 7 is a partial section view taken along section line 7—7 of FIG. 1.

The basic details of main turntable 6 and sub-turntable 13 are shown in FIG. 7, wherein it is seen that the outer portion of main ramp 6 is supported by a circular ball bearing assembly designated by reference numeral 71. Bearing assembly 71 includes an upper bearing guide 71A, a lower bearing guide 71C, and a plurality of ball bearings 71B rotatably disposed between bearing guides 71A and 71C, thereby allowing main turntable 6 to rotate freely. The center portion of main turntable 6 is supported by a vertical axle 58, which is rotatably coupled to vehicle frame 36 by means of a ball bearing assembly designated by reference numeral 73. Vehicle frame 36 also supports ball bearing assembly 71, previously described.

Motive power is supplied to effect rotating main turntable 6 by means of motor 63, which is connected by connecting wires (see FIG. 11) to control circuitry responsive to switches on the control panels shown in FIGS. 8 and 9, subsequently described. A ring gear having inner teeth which engage gear 65 is disposed along a cylindrical portion 6′ of turntable 6. Gear 65 is connected to a shaft of motor 63, so that when motor 63 is energized, gear 65 turns, causing rotation (either clockwise or counterclockwise) of main turntable 6.

Sub-turntable 13 includes a flat-topped circular platen 13′, the peripheral edges of which are supported by a bearing assembly designated by reference numeral 69. Bearing assembly 69 is supported on a ledge 66 of main turntable 6, so that the top of platen 13′ is flush with the upper surface of main turntable 6. The center portion of platen 13′ is supported by means of axle 59, which is rotatably supported at its lower ends on a rigid support arm 55 by means of a ball bearing assembly 61. A gear 57 is axially mounted on axle 59, and is rotated either clockwise or counterclockwise by means of a reversible motor 53 which drives a worm gear 54. Worm gear 54 engages gear 57, causing it to rotate.

Figure 8:
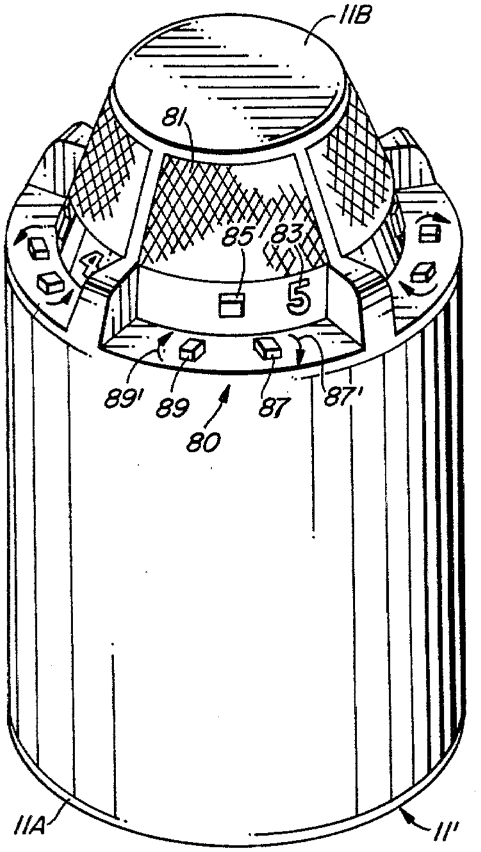
FIG. 8 is a perspective view of an alternate embodiment of the padded centerpost of the wheelchair-accommodating turntable shown in FIG. 1.

Referring now to FIG. 8, an alternate embodiment of padded centerpost 11 is designated by reference numeral 11'. A plurality of passenger consoles 80, one for each of the illustrated stations, corresponding to the location of each of the sub-turntables 13, are provided on the upper portion of centerpost 11'. Each console 80 has a speaker 81 by means of which the occupant of the wheelchair located in the corresponding station can hear words spoken by the bus driver. A microphone 85 permits the wheelchair occupant in the adjacent station to talk to the bus driver. Reference numeral 83 designates the number of the station to which the subject console corresponds. Reference numeral 89 designates a control button by means of which the occupant of the subject station can control clockwise rotation of the corresponding sub-turntable. Button number 87 can be depressed by the occupant of the subject station to cause counterclockwise rotation of the corresponding sub-turntable.

Figure 9:
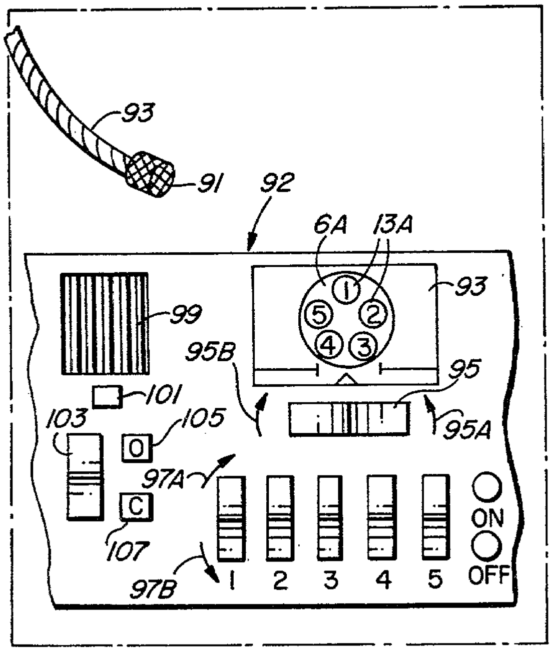
FIG. 9 is a diagram illustrating an operating panel for the driver of the transit vehicle shown in FIG. 1.

Referring now to FIG. 9, a control panel 92 for use by the bus driver is partially illustrated. Microphone 91, supported by flexible member 93, enables the bus driver to communicate with the wheelchair passengers in wheelchair accommodating region 5. Reference numeral 99 designates a speaker by means of which the bus driver can be addressed by one of the wheelchair occupants. Reference numeral 4 designates a lamp which is illuminated if one of the wheelchair occupants speaks, even if the volume control for speaker 99 is turned down, thereby alerting the bus driver. Reference numeral 103 designates a rocker switch which allows the bus driver to either lower retractable ramp 3 and open doors 25 and 27 or retract ramp 3 and close doors 25 and 27. Reference numerals 105 and 106, respectively, indicate whether ramp 3 is raised or lowered.

A group of five switches, including rocker switch 97, allow the bus driver to control rotation of the 5 respective sub-turntables. Rocker switch 95 allows the bus driver to advance the position of main turntable 6. Reference numeral 93 designates a turntable visual display, wherein reference numeral 6A represents main turntable 6, and reference numeral 13A designate sub-turntable 13. Reference numeral 13B designates an arrow which indicates the direction in which the front of the wheelchair occupying the station corresponding to each of the sub-turntables is pointed.

Figure 10:
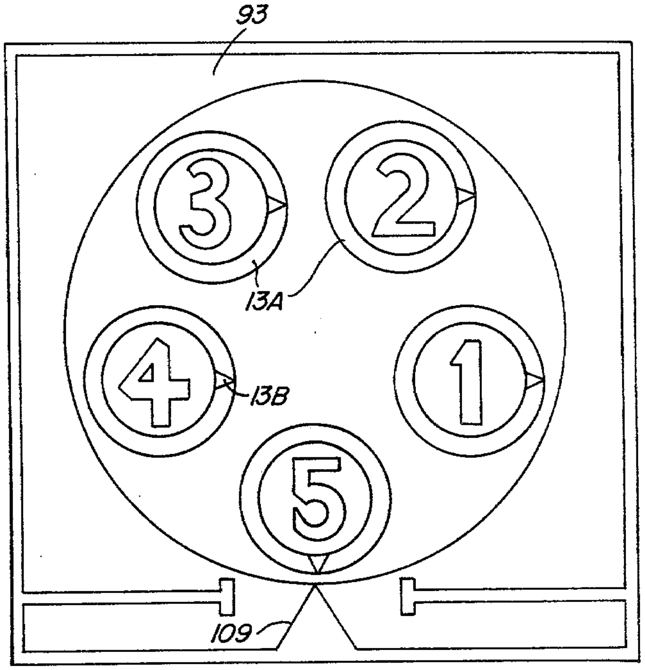
FIG. 10 is an enlarged plan view of a display element included in the control panel of FIG. 9.

In operation, the occupant of a particular station, for example, station No. 5, can inform the bus driver that he or she wishes to be unloaded at the next bus stop. The bus driver then utilizes rocker switch 95 to rotate main turntable 6 until sub-turntable 5 is adjacent to ramp 3. If the occupant of the wheelchair prefers to leave bus 1 by moving his or her wheelchair in the forward direction, he or she utilizes one of switches 89 or 87 in FIG. 8, causing sub-turntable 13 of station 5 to rotate in the direction indicated in FIG. 10. Conversely, if the occupant of the wheelchair wishes to back out of the bus, and down retractable ramp 3, the occupant would utilize switches 87 or 89 to cause the front of his or her wheelchair to point away from ramp 3.

During travel, the bus driver can override control of the direction of sub-turntable 13, and can cause the front of each wheelchair to point toward the front of the bus, if the bus driver believes it would be safer than allowing the occupants to each choose their own direction of orientation.

Figure 11:
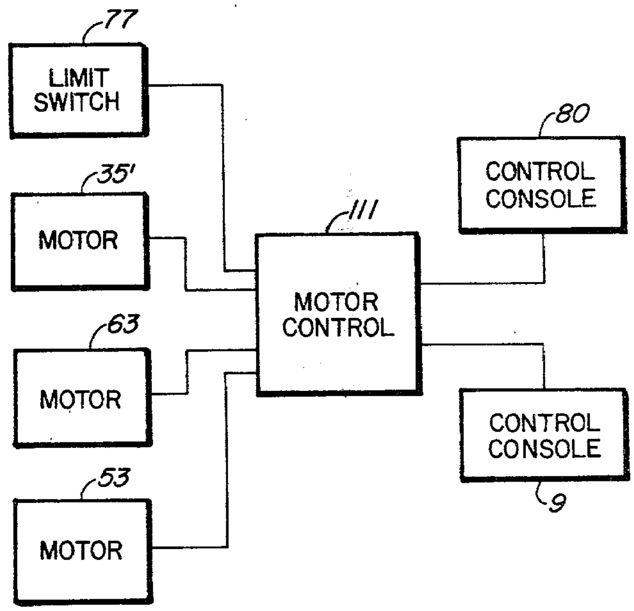
FIG. 11 is a schematic diagram showing the connections between the motors and control consoles of the invention.

Referring now to FIG. 11, a motor control unit 111 is connected to each of control consoles such as 80 (FIG. 8) and to the bus driver's control console 92 (FIG. 9). Motor control unit 111 is also connected to limit switch 77 (FIG. 6) and to motor 63 of FIG. 7. Motor control unit 111 is also connected to motor 35' of motor and pulley unit 35 of FIG. 5. Motor control unit 111 is further connected to motor 53 of FIG. 7. Those skilled in the electric motor control art can readily provide a suitable motor control unit 111 and the necessary connections to the control consoles, switches and motors in the described embodiment of the invention.

While the invention has been disclosed with reference to a particular embodiment thereof, those skilled in the art will be able to make various modifications to the disclosed embodiment of the invention without departing from the true spirit and scope thereof, as set forth in the appended claims. For example, numerous wheelchair lifts other than retractable ramp 7 could be utilized. Furthermore, various other types of bearing arrangements and gear arrangements for supporting and rotating main turntable 6 and sub-turntables 13 may be utilized. Furthermore, it is not essential that any of sub-turntables 13 be provided. A variety of automatic or manual devices protruding between stations from the floor of main turntable 6 or sub-turntables 13 or from wall 9 can be provided for enabling occupants of wheelchairs to fasten themselves and their wheelchairs securely thereto without requiring assistance by the bus driver. Furthermore, automatically inflatable ballooning safety devices can be provided in the walls of centerpost 11 and/or wall 9 for sensing any impact which the bus experiences and rapidly inflating against the wheelchair occupants to ensure their safety can be provided.

I claim:

1. A system for accommodating wheelchairs and occupants confined thereto in a transit vehicle, said system comprising in combination:

a. loading means for conveying the wheelchair and its occupant between a curb area and an edge of a floor area of the transit vehicle;

b. first turntable means rotatably disposed in the transit vehicle for receiving a plurality of wheelchairs with their respective occupants therein from said loading means, said first turntable means including a plurality of wheelchair-accommodating stations sequentially disposed around said first turntable; and c. first motive means for rotating said first turntable to align a selected one of said stations with said loading means to allow a wheelchair supporting its occupant to roll from said first loading means onto said selected station.

2. The system of claim 1 further including first retaining means disposed on said first turntable means at a central portion thereof for limiting movement of any wheelchair on said first turntable means toward said first retaining means.

3. The system of claim 2 wherein said first retaining means includes a cylindrical body having a cylindrical outer surface which is cushioned for preventing injury to a wheelchair occupant in the event that the wheelchair occupant collides with said cylindrical body.

4. The system of claim 3 wherein said first retaining means includes a communications console for enabling a wheelchair occupant to communicate with a driver of the transit vehicle.

5. The system of claim 1 wherein said first motive means includes a first electric motor and first gear means for coupling said first electric motor to said first turntable means for causing rotation of said first turntable means.

6. The system of claim 1 including first retaining means disposed adjacent to said first turntable means for limiting movement of any wheelchair on said first turntable means toward said first turntable means.

7. The system of claim 6 wherein said first retaining means includes a wall surrounding a portion of said first turntable means, said wall having a cushioned inner surface for preventing injury to a wheelchair occupant if the wheelchair occupant collides with said wall.

8. The system of claim 5 further including second turntable means included in said first turntable means for receiving one of said wheelchairs and its occupant and rotating that wheelchair and its occupant relative to said first turntable means.

9. The system of claim 8 further including second motive means for effecting said rotating of said one of said wheelchairs and its occupant.

10. The system of claim 9 wherein said second motive means includes a second electric motor and second gear means for coupling said second electric motor to said second turntable means.

11. The system of claim 10 including first and second control means for controlling rotation of said first and second turntable means in response to said first and second motors, respectively.

12. The system of claim 11 wherein said first and second control means include first and second switches, respectively, actuatable by the driver of said transit vehicle.

13. The system of claim 11 wherein said second control means includes a switch actuatable by an occupant of a wheelchair supported on said second turntable means to cause rotating of said second turntable means to position that wheelchair to allow convenient movement of that wheelchair from said first and second turntable means onto said loading means.

14. The system of claim 13 wherein said loading means includes a retractable ramp having a reversible conveying belt for moving a wheelchair and its occupant toward or away from said first turntable means.

15. The system of claim 14 further including a display means viewable by the driver of the transit vehicle to allow the driver to see the position of each wheelchair on said first turntable means without looking backwards while driving the transit vehicle.

* * * * *